US012624205B2

(12) United States Patent
Jeon et al.

(10) Patent No.: US 12,624,205 B2
(45) Date of Patent: May 12, 2026

(54) POLYCARBONATE RESIN COMPOSITION AND OPTICAL MOLDED ARTICLE COMPRISING THE SAME

(71) Applicant: LG CHEM, LTD., Seoul (KR)

(72) Inventors: Byoungkue Jeon, Daejeon (KR); Young In Yang, Daejeon (KR); Daehyeon Hwang, Daejeon (KR); Mooho Hong, Daejeon (KR); Ki Jae Lee, Daejeon (KR); Youngwook Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 677 days.

(21) Appl. No.: 17/262,112

(22) PCT Filed: Aug. 19, 2019

(86) PCT No.: PCT/KR2019/010497
§ 371 (c)(1),
(2) Date: Jan. 21, 2021

(87) PCT Pub. No.: WO2020/040504
PCT Pub. Date: Feb. 27, 2020

(65) Prior Publication Data

US 2021/0292550 A1 Sep. 23, 2021

(30) Foreign Application Priority Data

Aug. 20, 2018 (KR) ........................ 10-2018-0096966

(51) Int. Cl.

| | |
|---|---|
| ***C08L 69/00*** | (2006.01) |
| ***C08G 64/06*** | (2006.01) |
| ***C08K 5/17*** | (2006.01) |
| ***G02B 1/04*** | (2006.01) |

(52) U.S. Cl.
CPC ............ *C08L 69/005* (2013.01); *C08G 64/06* (2013.01); *C08K 5/175* (2013.01); *G02B 1/041* (2013.01); *C08L 2201/08* (2013.01); *C08L 2201/10* (2013.01); *C08L 2203/30* (2013.01)

(58) Field of Classification Search
CPC combination set(s) only.
See application file for complete search history.

(56) References Cited

U.S. PATENT DOCUMENTS 5,869,554 A 2/1999 Pickett et al.
2003/0175616 A1 9/2003 Berneth et al.
2004/0126700 A1* 7/2004 Lee ........................ C09B 23/143
2009/0054586 A1* 2/2009 Hein ...................... C09K 11/06 524/611
2009/0208755 A1 8/2009 Isozaki et al.
2009/0215934 A1* 8/2009 Nakamura .............. C08L 69/00 524/451
2010/0029812 A1 2/2010 Tanabe et al.
2010/0163814 A1 7/2010 Raasch-Malberg et al.
2012/0059098 A1* 3/2012 Monden ................... C08K 5/42 524/161
2014/0063831 A1* 3/2014 Lowery ................... C08L 69/00 524/106
2015/0299461 A1* 10/2015 Suzuki ..................... C08K 5/42 525/462
2016/0229954 A1 8/2016 Negishi et al.
2017/0088708 A1* 3/2017 Farrell .................... C08L 67/02
2019/0100614 A1* 4/2019 Ito .......................... C08G 75/02
2019/0203043 A1* 7/2019 Van Der Mee .......... C08J 7/056
2019/0300648 A1 10/2019 Chun et al.
2020/0200945 A1* 6/2020 Totani .................. C08K 5/5333
2020/0207947 A1* 7/2020 Ito .......................... C08G 18/38
2020/0332157 A1* 10/2020 Yun ........................ H10K 85/60
2021/0017359 A1 1/2021 Motegi
2022/0186025 A1* 6/2022 Yang ....................... C08L 69/00
2023/0226806 A1* 7/2023 Laubach ........... B32B 17/10788 428/1.62

FOREIGN PATENT DOCUMENTS

| | | | |
|---|---|---|---|
| CN | 1427990 | A | 7/2003 |
| CN | 106459568 | A | 2/2017 |
| CN | 107429055 | A | 12/2017 |
| CN | 110914322 | A | 3/2020 |
| JP | 11152404 | A | 6/1999 |
| JP | 2003-529475 | A | 10/2003 |
| JP | 2004-210763 | A | 7/2004 |
| JP | 2010-528143 | A | 8/2010 |
| JP | 5086802 | B2 | 11/2012 |
| JP | 2015-071679 | A | 4/2015 |
| JP | 2019-019300 | A | 2/2019 |
| KR | 10-2002-0088420 | A | 11/2002 |

(Continued)

OTHER PUBLICATIONS

Machine Translation of KR-20130124930-A, 2025 (Year: 2025).*

(Continued)

*Primary Examiner* — Liam J Heincer

(74) *Attorney, Agent, or Firm* — Bryan Cave Leighton Paisner LLP

(57) ABSTRACT

The present disclosure relates to a polycarbonate resin composition exhibiting excellent heat stability and optical properties, and an optical molded article comprising the same. The polycarbonate resin composition includes polycarbonate resin; and [[4-(dimethylamino)phenyl]methylene] propanedioic acid dimethyl ester as a hindered amine UV absorber that selectively absorbs UVA having a wavelength of 420 nm or less.

7 Claims, No Drawings

(56) References Cited

FOREIGN PATENT DOCUMENTS

| | | | | |
|---|---|---|---|---|
| KR | 10-2009-0088875 A | | 8/2009 | |
| KR | 10-2010-0017306 A | | 2/2010 | |
| KR | 20130124930 A | * | 11/2013 | ............ C08G 64/04 |
| TW | 200411019 A1 | | 7/2004 | |
| TW | I300223 B | | 8/2008 | |
| WO | 2015/186015 A1 | | 12/2015 | |
| WO | 2018-096758 A1 | | 5/2018 | |

OTHER PUBLICATIONS

Mokbel, et al. (2013). “Photoinitiating Systems of Polymerization and In Situ Incorporation of Metal Nanoparticles Into Polymer Matrices Upon Exposure to Visible Light: Push-Pull Malonate and Malononitrile Based Dyes.” Polym. Chem. vol 4. pp. 5679-5687.

* cited by examiner

POLYCARBONATE RESIN COMPOSITION AND OPTICAL MOLDED ARTICLE COMPRISING THE SAME

CROSS-REFERENCE TO RELATED APPLICATION

This application is a National Phase entry pursuant to 35 U.S.C. § 371 of International Application No. PCT/KR2019/010497, filed on Aug. 19, 2019, and claims priority to and the benefit of Korean Patent Application No. 10-2018-0096966 filed on Aug. 20, 2018 with the Korean Intellectual Property Office, the disclosures of which are hereby incorporated by reference in their entirety for all purposes as if fully set forth herein.

TECHNICAL FIELD

The present invention relates to a polycarbonate resin composition exhibiting excellent heat stability and optical properties, and an optical molded article comprising the same.

BACKGROUND

Polycarbonate is applied in various fields such as exterior material of electric and electronic products, automobile parts, building material, optical parts, and the like, due to excellent impact strength, numerical stability, heat resistance and transparency, and the like.

With recent expansion of the application fields of polycarbonate, there is a need to develop novel polycarbonate maintaining unique properties of polycarbonate but having improved heat stability and optical properties.

Particularly, in case applied for optical products, it is important to maintain optical properties of an aimed degree (excellent shield effect or transmittance) without deformation of products even under a high temperature condition, and thus, there is a need to develop technology for simultaneously improving heat stability and optical properties.

Thus, there are attempts to copolymerize aromatic diols of different structures to introduce monomers having a different structure into the main chain of polycarbonate, or use additional additives to obtain desired properties. However, most of the technologies have limitations in that the production cost is high, and if chemical resistance or heat resistance is increased, optical properties may be deteriorated to the contrary, and if optical properties are improved, chemical resistance or heat resistance may be deteriorated, and the like.

And, there is a need to control the transparency of polycarbonate according to the product group applied, and for example, when applied for optical products (for example, lens), there is a need to lower transmittance in the specific wavelength region according to the purpose of use.

Therefore, there is still a need to study and develop novel polycarbonate that not only fulfills aimed optical properties according to the applied products (excellent shield effect or low transmittance of specific wavelength light, and the like) but also has excellent heat resistance.

SUMMARY OF THE INVENTION

Brief Description

Thus, it is an object of the present invention to provide a polycarbonate resin composition exhibiting excellent heat stability and optical properties, more specifically, excellent properties of inhibiting discoloration and controlling transmission of light having a wavelength of 420 nm, and an optical molded article comprising the same.

The present invention provides a polycarbonate resin composition comprising polycarbonate resin; and

[[4-(dimethylamino)phenyl]methylene] propanedioic acid dimethyl ester as a hindered amine UV absorber that selectively absorbs UVA having a wavelength of 420 nm or less.

The present invention also provides an optical molded article comprising the above polycarbonate resin composition.

Hereinafter, a polycarbonate resin composition and an optical molded article comprising the same according to specific embodiments of the invention will be explained.

First, technical terms in the present specification are only for mentioning specific embodiments, and they are not intended to restrict the present invention.

A singular expression includes a plural expression thereof, unless it is expressly stated or obvious from the context that such is not intended.

As used herein, the term "comprise" is intended to designate the existence of practiced characteristic, number, step, constructional element or combinations thereof, and it is not intended to preclude the possibility of existence or addition of one or more other characteristics, numbers, steps, constructional elements or combinations thereof.

And, as used herein, the terms including ordinal numbers such as "a first" and "a second" are used only to distinguish one constructional element from other constructional elements, and the present invention is not limited to the ordinal numbers. For example, within the scope of the right of the present invention, a first constructional element can be named as a second construction element, and similarly, a second constructional element can be named as a first constructional element.

According to one embodiment of the invention, a polycarbonate resin composition is provided, which comprises: polycarbonate resin; and [[4-(dimethylamino)phenyl]methylene] propanedioic acid dimethyl ester as a hindered amine UV absorber that selectively absorbs UVA having a wavelength of 420 nm or less. The specific hindered amine UV absorber can have a structure represented by the following Chemical Formula A:

[Chemical Formula A]

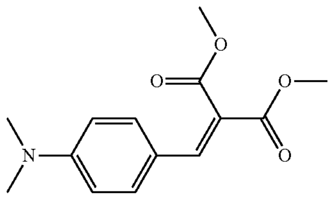

In the case of polycarbonate resin, according to the product group applied, it is necessary to control the transparency of polycarbonate, and for example, when applied for optical products (for example, lens), and the like, it was required to control or lower transmittance in the specific wavelength region according to the use purpose. However, in case additives are used simply for increasing shield effect, heat resistance is significantly lowered under a high temperature condition, thus generating modification or discoloration of polymer during the preparation process.

Thus, the present inventors continuously studied on polycarbonate resin compositions, particularly, various additives that can be used in optical products, for example, UV absorbers. As result, it was found out that among various UV absorbers, for example, by using a specific UV absorber represented by the Chemical Formula A, excellent properties can be achieved, and the present invention has been completed.

Particularly, by using the specific UV absorber and polycarbonate resin in combination, transmittance of UV having a specific wavelength of 420 nm can be very effectively controlled and decreased, and simultaneously, discoloration or modification under a high temperature can be inhibited, thereby achieving excellent heat resistance.

As result, in case the polycarbonate resin composition of one embodiment is used to prepare a product, the degree of modification or color change of polymer is remarkably low even under high temperature injection molding condition. And, the product can be practically used to exhibit excellent properties without deformation even under a high temperature environment. Particularly, in case used as an optical molded article such as lens, it can exhibit excellent shield effect in the UV region of specific wavelength, and thus, can be applied in the wide range such as general, industrial, sports, special purpose, and the like.

Hereinafter, each component of the polycarbonate resin composition of one embodiment will be explained in detail.

Polycarbonate Resin

As used herein, the term 'polycarbonate' means polymer prepared by reacting a diphenol-based compound, phosgene, and carbonate ester or a combination thereof. Since polycarbonate resin has very excellent heat resistance, impact resistance, mechanical strength and/or transparency, it is being widely used for the preparation of a compact disc, a transparent sheet, packaging material, a automobile bumper, a UV shield film, optical lens, and the like.

As the diphenol-based compound, hydroquinone, resorcinol, 4,4'-dihydroxydiphenyl, 2,2-bis(4-hydroxyphenyl) propane(also named as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis (4-hydroxyphenyl)ether, and the like can be mentioned. Preferably, 4,4'-dihydroxydiphenyl, 2,2-bis(4-hydroxyphenyl)propane can be used, and in this case, the polycarbonate resin can comprise repeating units represented by the following Chemical Formula 1:

[Chemical Formula 1]

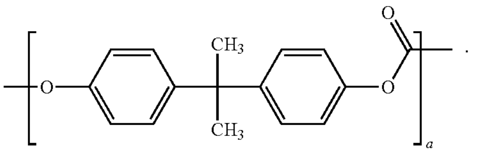

In the Chemical Formula 1, a is an integer equal to or greater than 1.

The polycarbonate resin can be in the form of copolymer or a mixture prepared from two or more kinds of diphenols. And, the polycarbonate resin can be in the form of linear polycarbonate, branched polycarbonate or polyester carbonate copolymer resin, and the like.

As the linear polycarbonate, polycarbonate prepared from bisphenol-A, and the like can be mentioned. As the branched polycarbonate, those prepared by reacting multifunctional aromatic compounds such as trimellitic anhydride, trimellitic acid, and the like with diphenols and carbonate can be mentioned. The multifunctional aromatic compound can be included in the content of 0.05 to 2 mol %, based on the total amount of the branched polycarbonate.

As the polyester carbonate copolymer resin, those prepared by reacting difunctional carboxylic acid with diphenols and carbonate can be mentioned. As the carbonate, diarylcarbonate such as diphenylcarbonate, ethylene carbonate, and the like can be used.

In the polycarbonate composition of one embodiment, the polycarbonate resin can a have melt flow rate (MFR) according to ASTM D1238 of 5 to 15 g/10 min. In case polycarbonate resin having a melt flow rate of the above range is used, when applied for a product in combination with the above explained other components, excellent properties can be achieved, and the polycarbonate resin composition of one embodiment can exhibit excellent processibility.

The melt flow rate can be measured at 300° C. under 1.2 kg load according to ASTM D1238.

If the melt flow rate is less than 5 g/min, processibility can be deteriorated, and thus, productivity can be deteriorated, and if it exceeds 15 g/min, resin flow can be exceeded under corresponding process conditions, and thus, surface defects can be generated in the molded product. And, more appropriately, the melt flow rate can be 6 to 13 g/10 min, or 7 to 10 g/10 min, and in this case, the resin composition of one embodiment can exhibit more excellent processibility and mechanical properties, and the like.

And, the polycarbonate resin can have a weight average molecular weight of 10,000 g/mol to 60,000 g/mol, or 47,000 g/mol to 60,000 g/mol, or 50,000 g/mol to 60,000 g/mol, or 50,000 g/mol to 58,000 g/mol. The weight average molecular weight of the resin can be measured using polystyrene as standard material, according to ASTM D5296. As the polycarbonate resin fulfills the above weight average molecular weight range, the resin composition of one embodiment and an optical molded article comprising the same can exhibit excellent mechanical properties and optical properties.

The above explained polycarbonate resin is a main component of the resin composition of one embodiment, and it can be included in the content of 80 to 99.99 wt %, or 90 to 99.9 wt %, or 95 to 99.5 wt % in the total resin composition. Thereby, the resin composition of one embodiment can exhibit heat resistance, impact resistance, mechanical properties and/or transparency characteristic of polycarbonate resin.

UV Absorber

The resin composition of one embodiment comprises a hindered amine UV absorber that selectively absorbs UVA having a wavelength of 420 nm or less, particularly, [[4-(dimethylamino)phenyl]methylene] propanedioic acid dimethylester represented by the following Chemical Formula A, together with the above explained polycarbonate resin.

[Chemical Formula A]

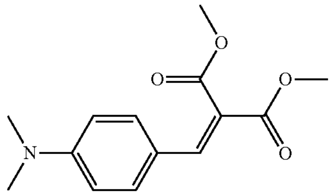

As the result of continuous experiments of the present inventors, it was confirmed that by comprising the specific UV absorber, among various UV absorbers exhibiting absorption property of UVA, the polycarbonate resin composition of one embodiment can very effectively control and decrease transmittance of UV having a specific wavelength of 420 nm, and discoloration or modification under a high temperature can be inhibited, thereby exhibiting excellent heat resistance.

The specific UV absorber is a commercially known component under a product name of X-GUARD EV-290, and the like, and such an UV absorber can be commercially acquired, or it can be synthesized by a method well known to a person having ordinary knowledge in the art.

The UV absorber can be included in the content of 0.01 to 0.5 wt %, or 0.015 to 0.1 wt %, or 0.015 to 0.05 wt % in the total resin composition. Thereby the resin composition of one embodiment can exhibit excellent performance of controlling transmittance of 420 nm wavelength light, and low discoloration property under a high temperature, and simultaneously, may not hinder the excellent mechanical properties, and the like, of polycarbonate resin.

Meanwhile, the resin composition of one embodiment can further comprise one or more additives selected from the group consisting of an antioxidant, a heat stabilizer, a chain extender, a nucleating agent, a flame retardant, a lubricant, an impact modifier, and a fluorescent whitening agent commercially used in the art, as necessary, in addition to the above explained polycarbonate resin and UV absorber.

Meanwhile, the resin composition of one embodiment can exhibit transmittance of 420 nm wavelength UV according to ASTM D1003, of 30% or less, or 5 to 30%, or 10 to 30%, or 20 to 30%. Such a transmittance can be measured and calculated, for example, by measuring transmittance of 420 nm under transmission condition of 350-1050 nm, using Hunter Lab equipment, after injection molding the resin composition of one embodiment into a rectangular specimen (3T injection molded specimen) having a thickness of 3 mm and a plane scale of 30*50 mm.

As the resin composition of one embodiment fulfills the above transmittance range, it can effectively shield UV having a wavelength of 420 nm or less, and appropriately control and decrease the transmission, and thus, can be applied for various optical molded articles such as general, industrial, sports, special purpose, and the like.

And, the resin composition of one embodiment can have a yellow index change value represented by the following General Formula 1, of 0.5 or less, or 0.1 to 0.4, or 0.2 to 0.35:

$$\Delta YI = YI(340°\ C.) - YI(285°\ C.) \quad \text{[General Formula 1]}$$

YI(X° C.) denotes a yellow index value measured at a corresponding temperature X ° C. according to ASTM D1925, and a temperature rise time from 285° C. to 340° C. is 20 minutes.

In the measurement of the yellow index change value, first, a yellow index change value at 285° C.(YI(285° C.)) can be measured. Such a YI(285° C.) can be measured, for example, under transmission condition of 350-1050 nm, using Hunter Lab equipment, according to ASTM D1925, after injection molding the resin composition of one embodiment into a rectangular specimen (3T injection molded specimen) having a thickness of 3 mm and a plane scale of 30*50 mm. Thereafter, the temperature of the composition of one embodiment is raised from 285° C. to 340° C. for 20 minutes, and then, YI(340° C.) is measured by the same method as the YI(285° C.), and from the measurement values, the yellow index change value can be measured/calculated.

As the resin composition of one embodiment fulfills the above yellow index change value range, the composition of one embodiment can exhibit more excellent heat resistance and thermal discoloration resistance, and maintain excellent optical properties even under a high temperature. Thereby, in case an optical molded article is prepared with the resin composition of one embodiment, the degree of color change or modification of polymer can be maintained small even under high temperature injection molding conditions. And, the optical molded article can be practically used to exhibit excellent properties without deformation even under a high temperature environment.

And, the resin composition of one embodiment can have a yellow index (YI) measured at 20° C., of 5 to 10, or 7 to 9. Such a yellow index can be measured by the same method as the YI(285° C.), and the like, except the measurement temperature. As the resin composition of one embodiment fulfills the above yellow index range even at a room temperature, it can exhibit excellent optical properties suitable for an optical molded article.

As evidenced in the following Examples and Comparative Examples, as the result of experiments of the present inventors, it was confirmed that the above explained properties, for example, transmittance range, yellow index change value, and yellow index can be achieved for the first time by the resin composition of one embodiment comprising polycarbonate resin and a specific UV absorber. Thus, the composition of one embodiment and an optical molded article comprising the same can realize heat resistance and excellent optical property (shield effect at 420 nm) by fulfilling the above explained properties, and thus, can be very preferably applied for optical articles such as lens in various fields.

Thus, according to another embodiment of the invention, an optical molded article comprising the resin composition of one embodiment is provided. Preferably, the optical molded article is lens, and is suitable for use in lighting lens or glass lens.

Such an optical molded article can be prepared by a method commonly used in the art, except using the composition of one embodiment. For example, the above explained components can be mixed to obtain the resin composition of one embodiment, which is then melt kneaded to prepare a pellet, and a specimen can be injection molded into the aimed shape.

The melt kneading can be conducted by a method commonly used in the art, for example, using a ribbon blender, a henschel mixer, a banbury mixer, a drum tumbler, a single screw extruder, a twin screw extruder, a co-kneader, a multi screw extruder, and the like. The temperature of the melt kneading can be appropriately controlled as necessary.

Next, using the melt kneaded substance or pellet of the resin composition of one embodiment as raw material, injection molding, injection compression molding, extrusion molding, vacuum molding, blow molding, press molding, pressured air molding, foaming, heat bending, compression molding, calendering and rotation molding, and the like, can be applied.

In case extrusion molding is used, a high temperature condition of 200 to 400° C. is applied, but since the resin composition of one embodiment has excellent heat resistance, modification of polymer or yellowing is hardly occur in the melt kneading or injection process.

The size, thickness, and the like of a molded article can be appropriately controlled according to the purpose of use, and the shape of a light guide plate can be flat or curved, according to the purpose of use.

According to the present invention, a polycarbonate resin composition and optical molded article exhibiting excellent heat stability (heat resistance), thermal discoloration resistance, and optical properties, are provided.

Detailed Description of the Embodiments

Hereinafter, preferable examples are presented for better understanding of the invention. However, these examples are presented only as the illustrations of the invention, and the present invention is not limited thereby.

EXAMPLES AND COMPARATIVE EXAMPLES: PREPARATION OF POLYCARBONATE RESIN COMPOSITIONS

Examples 1 and 2, Comparative Examples 1 to 7

Based on 100 parts by weight of a polycarbonate resin cornposition, each additive was mixed in the content described in the following Table 1 to prepare a polycarbonate resin composition.

The details of each component used in the Table 1 are as follows:

PC resin: Mw 32,000, LG Chem. bisphenol A type linear polycarbonate having MFR (300° C., 1.2 kg) of 8 g/10 min;

PET resin: Mw 32,000, ESPEL 9940 E-37 manufactured by Hitach Chemical;

Antioxidant: PEP36 manufactured by ADEKA corporation;

EV 290: X-GUARD EV-290(UV absorber) manufactured by Chempia Co., Ltd.

Uvinul 3049: Uvinul 3049 (UV absorber) manufactured by BASF corporation

T326: T326 (UV absorber) manufactured by BASF corporation

T360: T360 (UV absorber) manufactured by BASF corporation

LA-F70: LA-F70 (UV absorber) manufactured by ADEKA corporation

UVINUL A PLUS: UVINUL A PLUS (UV absorber) manufactured by BASF corporation

Chain extender: ADR4370F(4468) manufactured by BASF corporation

Lubricant: PETS manufactured by NOF corporation

Experimental Examples

For the resin compositions prepared according to Examples and Comparative Examples, pellet samples were prepared at a speed of 55 kg per hour in a twin screw extruder (L/D=36, ϕ=45, barrel temperature 240° C.), and the properties of the prepared specimens were measured as follows. Such a specimen for measuring the properties was a rectangular specimen (3T injection molded specimen) having a thickness of 3 mm and a plane scale of 30*50 mm.

(1) Transmittance (%)

Transmittance at 420 nm was measured under transmission condition of 350 1050 nm, using Hunter Lab equipment, according to ASTM D1003, and the results were shown in the following Table 2.

(3) Yellow Index and Yellow Index Change Value (ΔYI)

A yellow index was measured under transmission condition of 350~1050 nm, using Hunter Lab equipment, according to ASTM D1925. First, the yellow index measured at 20° C. was shown in the following Table 2.

TABLE 1

| | Parts by weight | Example 1 | Example 2 | Comparative Example 1 | Comparative Example 2 | Comparative Example 3 | Comparative Exampl e4 | Comparative Example 5 | Comparative Example 6 | Comparative Example 7 |
|---|---|---|---|---|---|---|---|---|---|---|
| Resin | PC (Mw 32,000) | 99.505 | 99.5075 | 99.025 | 99.025 | 99.025 | 99.425 | 99.505 | | |
| | PET (Mw 32,000) | | | | | | | | 99.505 | 99.5075 |
| additives | Antioxidant | 0.075 | 0.075 | 0.075 | 0.075 | 0.075 | 0.075 | 0.075 | 0.075 | 0.075 |
| | EV290 | 0.02 | 0.0175 | | | | | | 0.02 | 0.0175 |
| | Uvinul3049 | | | 0.5 | | | | | | |
| | T326 | | | | 0.5 | | | | | |
| | T360 | | | | | 0.5 | | | | |
| | LA-F70 | | | | | | 0.1 | | | |
| | UVINUL A PLUS | | | | | | | 0.02 | | |
| | Chain extender | 0.05 | 0.05 | 0.05 | 0.05 | 0.05 | 0.05 | 0.05 | 0.05 | 0.05 |
| | Lubricant | 0.35 | 0.35 | 0.35 | 0.35 | 0.35 | 0.35 | 0.35 | 0.35 | 0.35 |

And, a yellow index at 285° C.(YI(285° C.)) was measured, and then, the temperature of each specimen was raised from 285° C. to 340° C. for 20 minutes, and then, YI(340° C.) was measured by the same method as the YI(285° C.). From the measurement values, a yellow index change value according to the following General Formula 1 was calculated, and the results were shown in the following Table 2.

$$\Delta YI = YI(340° C.) - YI(285° C.)$$ [General Formula 1]

TABLE 2

| | Transmittance at 420 nm (%) | YI (20° C. ) | Δ YI |
|---|---|---|---|
| Example 1 | 26 | 8 | 0.32 |
| Example 2 | 30 | 8 | 0.31 |
| Comparative Example 1 | 43 | 17 | 0.24 |
| Comparative Example 2 | 48 | 3 | 0.21 |
| Comparative Example 3 | 49 | 4 | 0.22 |
| Comparative Example 4 | 29 | 22 | 3.5 |
| Comparative Example 5 | 45 | 10 | 0.37 |
| Comparative Example 6 | 26 | 8 | 4.7 |
| Comparative Example 7 | 30 | 8 | 4.9 |

As shown in the Table 2, it was confirmed that Examples 1 and 2 exhibit excellent heat resistance and optical properties.

To the contrary, it was confirmed that in the case of Comparative Examples, under high temperature conditions, heat resistance is lowered, and a yellow index change value is remarkably increased, or transmittance at 420 nm is increased, and thus, they are not appropriate for use in optical molded articles, particularly lens.

What is claimed is:

1. A polycarbonate resin composition comprising:

95 to 99.99 wt % of polycarbonate resin having a melt flow rate (MFR) according to ASTM D1238 of 5 to 15 g/10 min; and 0.02 to 0.1 wt % of [[4-(dimethylamino)phenyl]methylene] propanedioic acid dimethyl ester as a hindered amine UV absorber that selectively absorbs ultraviolet ray A (UVA) having a wavelength of 420 nm or less, wherein the polycarbonate resin is a linear polycarbonate homopolymer consisting essentially of repeating units derived from bisphenol A, wherein the polycarbonate resin has a weight average molecular weight of 32,000 g/mol to 60,000 g/mol, wherein the polycarbonate resin composition has a transmittance of UV having a wavelength of 420 nm measured according to ASTM D1003 of 26% or less, and wherein the polycarbonate resin composition has a yellow index change value (ΔYI) represented by General Formula 1 of 0.32 or less:

$$\Delta YI = YI(340° C.) - YI(285° C.)$$ [General Formula 1]

wherein YI (X° C.) denotes a yellow index value measured at a corresponding temperature X ° C. according to ASTM D1925, and a temperature rise time from 285° C. to 340° C. is 20 minutes.

2. The polycarbonate resin composition according to claim 1, further comprising one or more additives selected from the group consisting of an antioxidant, a heat stabilizer, a chain extender, a nucleating agent, a flame retardant, a lubricant, an impact modifier, and a fluorescent whitening agent.

3. The polycarbonate resin composition according to claim 1, wherein the yellow index value (YI) measured at 20° C. is 5 to 10.

4. An optical molded article comprising the polycarbonate resin composition of claim 1.

5. The optical molded article according to claim 4, wherein the optical molded article is lens.

6. An optical molded article comprising the polycarbonate resin composition of claim 3.

7. The optical molded article according to claim 6, wherein the optical molded article is lens.

* * * * *